N. C. MILLER.
KNUCKLE CONNECTION FOR AUTOMOBILE WHEELS.
APPLICATION FILED MAR. 22, 1913.
1,142,190.
Patented June 8, 1915.
2 SHEETS—SHEET 1.
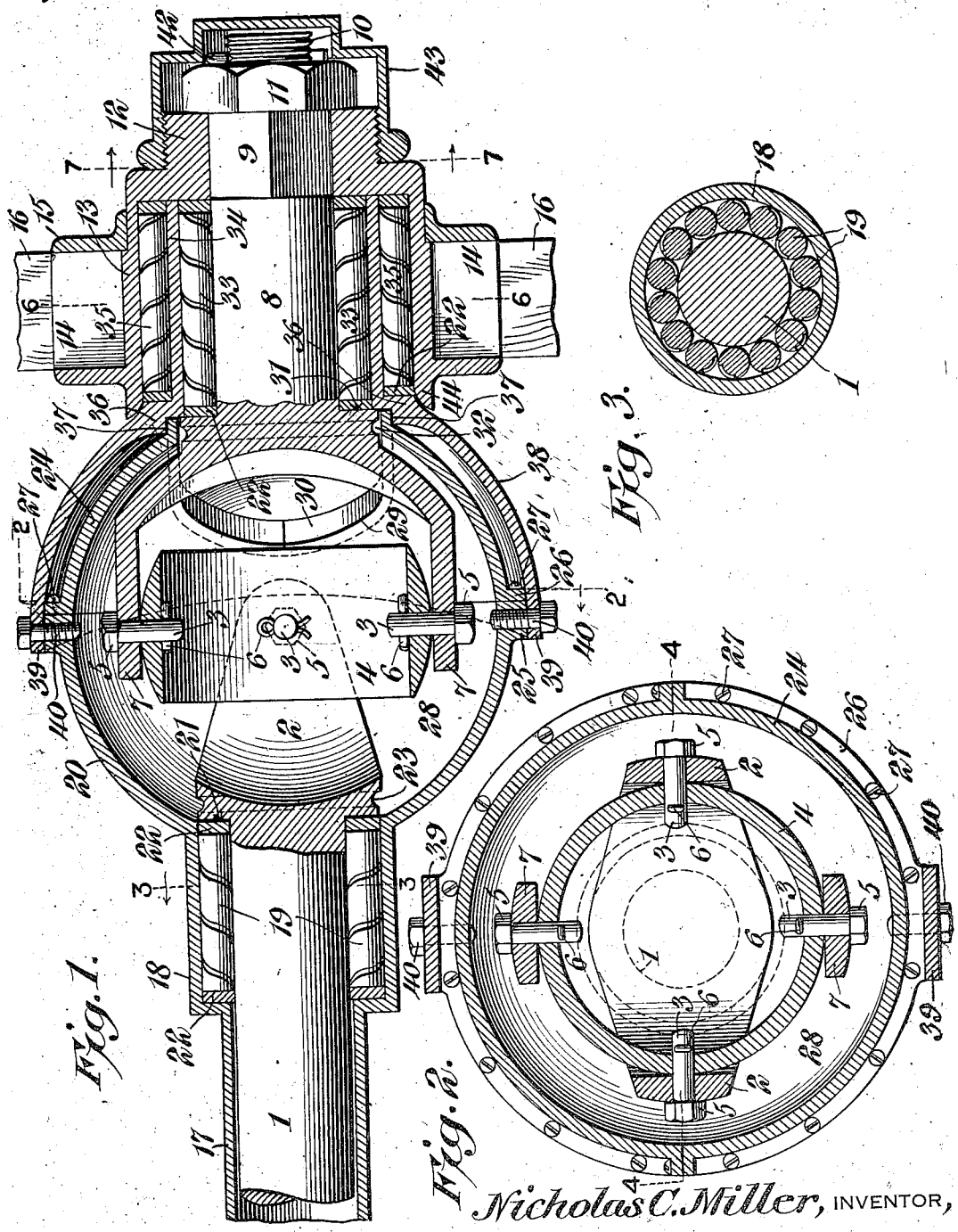
Nicholas C. Miller, INVENTOR,
WITNESSES
Howard D. Orr.
F. T. Chapman.
BY
E. G. Siggers
ATTORNEY

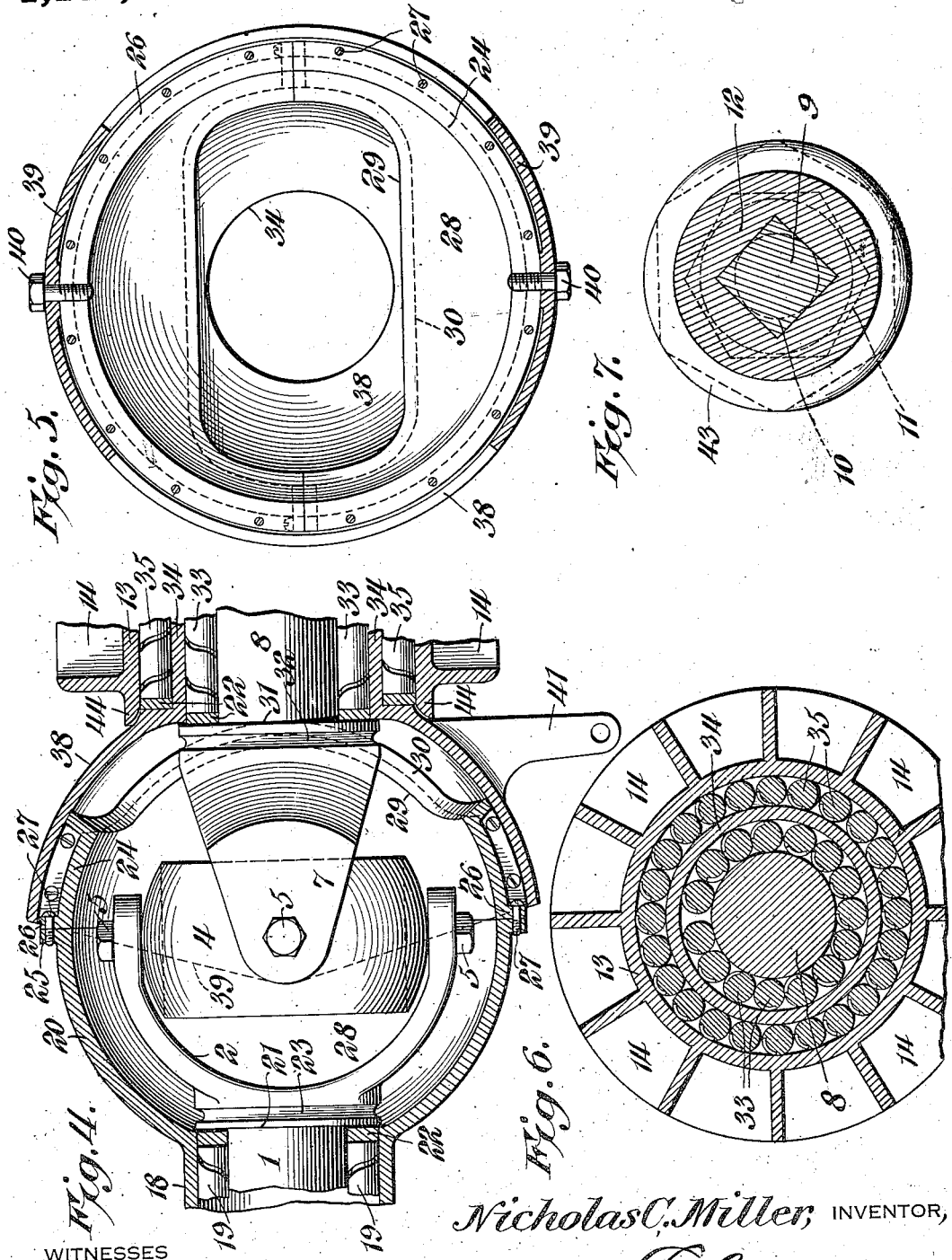

UNITED STATES PATENT OFFICE.

NICHOLAS C. MILLER, OF DODGEVILLE, WISCONSIN.

KNUCKLE CONNECTION FOR AUTOMOBILE-WHEELS.

1,142,190.      Specification of Letters Patent.      Patented June 8, 1915.

Application filed March 22, 1913. Serial No. 756,255.

*To all whom it may concern:*

Be it known that I, NICHOLAS C. MILLER, a citizen of the United States, residing at Dodgeville, in the county of Iowa and State of Wisconsin, have invented a new and useful Knuckle Connection for Automobile-Wheels, of which the following is a specification.

This invention has reference to improvements in knuckle connections for automobile wheels, and its object is to provide a knuckle connection for automobile wheels which latter at the same time may constitute the drive wheels of the vehicle and, furthermore, the invention is designed to provide means whereby the transmission mechanism which because of the movements demanded of the drive wheels is of the universal type, may be at all times bathed in lubricant, without liability of such leakage as would cause soiling of the exterior parts.

In accordance with the present invention there is provided a drive axle carrying the drive wheels and directly connected therewith, so that the drive wheels participate in the rotative movements of the axle, but these drive wheels are designed to have the movements usually imparted to steering wheels of automobiles, and therefore the drive axle is connected to the drive wheels through a joint which may have universal movements within the range usually employed for steering the wheels. At the same time the connecting members permitting such universality of movement are housed in a casing which permits the range of movement desired, but which at the same time is capable of carrying a supply of lubricant sufficient to thoroughly bathe all the moving parts, and, by the employment of a suitable one of the heavier lubricants, escape of such lubricant from the casing is prevented under practical conditions without interference with the range of movement desired.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings but may be changed and modified so long as such changes and modifications mark no material departure from the salient features of the invention.

In the drawings: Figure 1 is a central longitudinal section of the knuckle connection between a drive axle and a combined drive and steering wheel, some parts being shown in elevation and some parts being broken away. Fig. 2 is a section on the line 2—2 of Fig. 1. Fig. 3 is a section on the line 3—3 of Fig. 1. Fig. 4 is a plan view of the knuckle connection with the casing shown in section in a plane substantially perpendicular to that of Fig. 1. Fig. 5 is a section similar to that of Fig. 2 but looking in the opposite direction with all parts but the casing omitted. Fig. 6 is a section on the line 6—6 of Fig. 1 and omitting the spokes of the wheel. Fig. 7 is a section on the line 7—7 of Fig. 1.

Referring to the drawings there is shown a shaft 1 terminating at one end in a yoke 2, the ends of the legs of which carry oppositely disposed pins 3 projecting at diametrically opposite points through a ring 4. The pins 3 are shown as plain pins, each provided at one end with a head 5 exterior to the legs of the yoke 2 and at the other end within the ring 4 traversed by a cotter pin 6. These structures are indicative of any suitable means whereby the ring 4 may be mounted in the yoke 2.

Pinned to the ring 4 at diametrically opposite points and in substantially a hundred and eighty degree relation to the yoke 2 is another yoke 7, from which projects a stem 8 at times in line with the shaft 1, and this stem terminates in a squared portion 9 and a threaded extension 10 in the same axial line, the said threaded portion 10 being designed to receive a nut 11.

Mounted on the squared portion 9 is a hub 12 which may have a squared passage therethrough, and this hub is held to the shaft prolongation or stem 8 by the nut 11. The squared portion 9 is spaced from the yoke 7 for a suitable distance and the hub 12 is provided with a return overhang 13 of a length about that of the length of the shaft prolongation 8, and this overhang is arranged in concentric relation to the prolongation 8. The overhang 13 is provided with an exterior circular series of pockets 14 closed at one end by a removable ring 15, the pockets being designed to receive the butt ends of spokes 16 which may be taken as indicative of a suitable wheel.

Surrounding the shaft 1 is a sleeve 17 which does not participate in the rotative movements of the shaft 1 and which constitutes an axle of the vehicle, such axle being in fixed relation to the vehicle. Near the yoke end or shaft 1 the axle 17 is radially enlarged as shown at 18 to form a pocket for anti-friction rollers 19 surrounding the shaft 1 adjacent the yoke, and from the enlargement 18 the axle is further expanded into a substantially semi-spherical portion 20 within which the yoke 2 is lodged, and this yoke where it joins the shaft 1 is provided with a radial shoulder 21 abutting against a ring 22 which with another ring 22 confines the rollers 19 in place. The enlarged portion of the yoke adjacent the shoulder 21 is provided with a peripheral groove 23.

Attached to the equatorial portion of the semi-spherical enlargement 20 is a substantially semi-spherical two-piece member 24, and the two semi-spherical portions or hemispheres 20 and 24 are provided at their meeting or equatorial portions with peripheral flanges 25, 26, respectively, by which they may be secured together by suitable screws 27 traversing these flanges or any other suitable means for connecting the two hemi-spheres may be employed. These two hemispherical members 20 and 24 inclose a substantially spherical chamber 28. The polar end of the hemispherical member 24 is formed with a substantially longitudinal slot or passage 29, surrounded by an outstanding flange 30.

The shaft extension 8 where it joins the yoke 7 is formed with a radial shoulder 31 between which and the legs of the yoke the yoke is provided with a peripheral groove 32, the said yoke at this point being of sufficient diameter to extend approximately from one side of the slot 29 to the other, but this slot is long enough to permit the shaft extension 8 to swing to one side or the other of a prolongation of the longitudinal axis of the shaft 1 to the desired extent to provide for the movement of the wheel in steering.

Immediately surrounding the shaft extension 8 is a series of rollers 33 and surrounding these rollers is a sleeve 34 concentric with the shaft extension 8 and between which sleeve 34 and the inner wall of the overhang 13 there is another series of rollers 35. One end of the sleeve 34 is substantially coincident with the inner end of the hub 12 where lodged on the squared end 9 of the shaft extension 8, while the other end of the sleeve 34 is thickened and radially extended, as indicated at 36, being there formed with a rabbet 37 receiving the flange 30 and from the enlarged portion 36 there extends a curved shield 38 conforming in curvature or concentric with the hemispherical casing member 24. The shield 38 terminates in diametrically opposite ears 39 traversed by cap screws 40 or other suitable devices made fast to the spherical casing made up of the members 20 and 24 at the equatorial portion thereof, so that the shield 38 may move about the screws 40 as an axis in concentric relation to the spherical casing and in contact with the flange 30 which has a sufficient radial extent to engage in the rabbet 37 and against the inner wall of the shield 38 to close the slot 29 even though the shield 38 move for a considerable distance to one side or the other of the position of alinement with the shaft extension 8 with the shaft 1. Since the shaft 8 and the hub overhang 13 move together while the sleeve 34 is stationary so far as rotative movement is concerned, the double concentric roller bearings 33 and 35 form antifriction supports for the rotating parts.

An arm 41, shown in Fig. 4, may be formed on the shield 38 or on any other suitable part movable with the shield and with the wheel, and this arm is designed for the attachment of the steering mechanism of the vehicle, which steering mechanism may be that customarily employed and therefore needing no description or showing in this case. The circumferential extent of the shield 38 and the corresponding extent of the slot 29 is sufficient for the steering movements without the shield uncovering the slot and without the yoke 7 coming into engagement with the ends of the slot 29. When the parts are in position and the vehicle is moving straight ahead, the relation of these parts is substantially that shown in Fig. 1 with the bolts 40 and pins 3 connecting the yokes 2 and 7 with the ring 4 all in substantially one upright plane. Under these circumstances the shafts 1 and 8 are in alinement and the vehicle under the rotation of the shaft 1 is driven straight ahead.

An appropriate amount of lubricant is introduced into the casing made up of the members 20 and 24 and as the openings in this casing are quite tightly closed a heavy lubricant will not escape and in the case of lighter lubricants very little will escape. The slot 29 is covered by the shield 38 which may actually contact with the outer edge of the flange 30 while the grooves 23 and 32 prevent to a large extent any creeping of the lubricant.

The rollers 33 and 35 have end rings 22 like the rollers 19 and the nut 11 which may be locked to the threaded extension 10 by a cotter pin 42 may be protected by a cap 43 screwed on to the hub 12 which is suitably shouldered and threaded for the purpose.

If it be assumed that the shaft 1 is rotating with the extension 8 in alinement with it, then power is transmitted from the shaft 1 to the yoke 2, ring 4, yoke 7 and shaft extension 8 to the hub 12, and by the latter to the overhang 13 and through the spokes 16 to the rim of the wheel, thus driving the vehicle. If, now, it be desired to direct the vehicle to one side or the other of the straight path the shield 38 is swung in the proper direction about the bolts 40 which serve as pivots therefor, and the yoke 7 where traversing the slot 29 will move lengthwise of the slot to a corresponding extent, thus carrying the shaft extension 8 with the wheel mounted thereon into acute angular relation to the longitudinal axis of the shaft 1. However, this does not interfere with the transmission of power because of the universal joint connection due to the presence of the yokes 2 and 7 and the ring 4. This swinging movement is not participated in by the substantially globular three part casing which remains in fixed relation to the hollow axle 17.

The present invention provides a very simple knuckle joint between the axle and the steering wheel and at the same time a very simple knuckle joint of the universal type between the drive shaft and the same wheel, the shaft extending through the axle, while all the parts not provided with roller bearings are effectively bathed in lubricant at all times, the casing forming a tight receptacle for lubricant up to a certain height and a sufficiently tight receptacle for the stiffer types of lubricant of the semi-grease form to prevent leakage thereof where packing is not present, it being found in practice that engaging metal surfaces are substantially tight for such lubricants. The overhang 13 has the edge remote from the hub 12 and indicated at 44 in sufficiently close relation to the corresponding portion of the outer surface of the shield or hood 38 to prevent any material leakage of lubricant at this point, while the adjacent rings 22 may be suitably formed to act as dust guards at this point.

The whole device is readily constructed along the lines which permit the use of a bath of lubricant for the connections between the drive shaft and the wheel mounting and which will retain the lubricant and at the same time prevent the entrance of dust or dirt into the interior parts where it might do harm.

What is claimed is:—

1. In a combined driving and steering mechanism for vehicles, a drive shaft, a driven member, driving connections between the drive shaft and the driven member permitting movements of the driven member out of alinement with the drive shaft, a fixed casing receiving the driving connections and provided in its outer portion with a horizontal elongated slot for the driven member and having an outwardly projecting marginal flange at the said slot, said casing being otherwise completely closed so as to entirely inclose the driving connections, a curved shield pivoted at its inner edge to the said casing and movable over the exterior thereof, said shield being of a size to cover the slot and presenting a curved face to the outer marginal flange and supported by the same, and a wheel mounted for rotation on the outer portion of the shield and located beyond the vertical plane of the casing and the driving connections, said wheel being connected with the driven member.

2. In a combined driving and steering mechanism for vehicles, a drive shaft, a driven member, driving connections between the drive shaft and the driven member permitting movements of the driven member out of alinement with the drive shaft, an axle, a substantially spherical casing receiving the driving connections and composed of a substantially semispherical inner section fixed to the axle, and a substantially semispherical outer section rigidly secured to the inner section of the casing and provided in its outer portion with a horizontal slot for the driven member, said casing being otherwise completely closed so as to entirely inclose the driving connections, a shield pivotally connected to the casing and movable over the outer section thereof and being of a size to cover the slot in the out of alinement positions of the driven member, said shield having a bearing against the outer section at the walls of the slot, and a wheel mounted for rotation on the outer portion of the shield beyond the vertical plane of the casing and the driving connections, said wheel being connected with the driven member.

In testimony, that I claim the foregoing as my own, I have hereto affixed my signature in the presence of two witnesses.

NICHOLAS C. MILLER.

Witnesses:
ARTHUR STRONG,
H. C. STRONG.